(12) United States Patent
Kim et al.

(10) Patent No.: US 8,855,694 B2
(45) Date of Patent: Oct. 7, 2014

(54) INTERFERENCE ALIGNMENT SCHEME FOR USE IN COMMUNICATION NETWORK

(75) Inventors: Young-Doo Kim, Seoul (KR); Chan Soo Hwang, Yongin-si (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 788 days.

(21) Appl. No.: 12/567,780

(22) Filed: Sep. 27, 2009

(65) Prior Publication Data

US 2010/0226293 A1 Sep. 9, 2010

(30) Foreign Application Priority Data

Mar. 4, 2009 (KR) ........................ 10-2009-0018448

(51) Int. Cl.
 *H04W 28/02* (2009.01)
 *H04B 15/02* (2006.01)

(52) U.S. Cl.
 CPC ..................................... *H04B 15/02* (2013.01)
 USPC .............. 455/513; 455/39; 370/278; 370/282

(58) Field of Classification Search
 USPC .............. 370/229, 230, 230.1, 235, 276, 277, 370/278, 282, 310; 455/39, 500, 513
 See application file for complete search history.

(56) References Cited

U.S. PATENT DOCUMENTS

| | | | | |
|---|---|---|---|---|
| 6,178,196 | B1 * | 1/2001 | Naguib et al. ................. | 375/148 |
| 2006/0098760 | A1 * | 5/2006 | Shen et al. ..................... | 375/299 |
| 2007/0281746 | A1 * | 12/2007 | Takano et al. ............... | 455/562.1 |
| 2007/0298718 | A1 * | 12/2007 | Je et al. ......................... | 455/63.1 |
| 2008/0152032 | A1 * | 6/2008 | Lee et al. ...................... | 375/260 |
| 2008/0198941 | A1 * | 8/2008 | Song et al. .................... | 375/260 |
| 2008/0219194 | A1 * | 9/2008 | Kim et al. ..................... | 370/310 |
| 2008/0292013 | A1 * | 11/2008 | Varadarajan et al. ......... | 375/260 |
| 2009/0067403 | A1 * | 3/2009 | Chan et al. .................... | 370/343 |
| 2010/0265813 | A1 * | 10/2010 | Pereira et al. ................. | 370/201 |

FOREIGN PATENT DOCUMENTS

| | | |
|---|---|---|
| KR | 10-2006-0130062 | 12/2006 |
| KR | 10-2008-0064432 | 7/2008 |

OTHER PUBLICATIONS

Krishna Gomadam, et al. "Approaching the Capacity of Wireless Networks through Distributed interference Alignment," Global Telecommunications Conference, 2008, IEEE GLOBECOM 2008, Nov. 30, 2008, pp. 1-10.

Vivek R. Cadambe, et al. "Capacity of Wireless networks within o(log(SNR))—The Impact of Relays, Feedback, Cooperation and Full-Duplex Operation," Comput. Res. Repos. 2008, Article No. 0802.0534, pp. 1-22.

Viveck R. Cadambe, et al. "Interference Alignment and Spatial Degrees of Freedom for the K User Interference Channel," IEEE Transactions on Information Theory, Aug. 2008, pp. 1-30.

Sang Won Choi, et al. "On the Multiplexing Gain of K-user Partially Connected Interference Channel," IEEE Transactions on Information Theory, Jun. 29, 2008, pp. 1-15.

* cited by examiner

*Primary Examiner* — Edan Orgad
*Assistant Examiner* — Curtis A Alia
(74) *Attorney, Agent, or Firm* — NSIP Law

(57) ABSTRACT

A communication network applying an interference alignment scheme with a low or reduced complexity is provided. The communication network may include a plurality of transmit nodes and a plurality of receive nodes. A plurality of combinations of transmit-receive pairs may exist between the plurality of transmit nodes and the plurality of receive nodes. A communication apparatus for the communication network may select, from candidate combinations of transmit-receive pairs, a target combination to be applied with the interference alignment scheme. In particular, the communication apparatus may sequentially decrease a number of candidate combinations to select the target combination with a low complexity.

20 Claims, 9 Drawing Sheets

FIG. 3

CANDIDATE COMBINATION 1 : [S1,D1],[S2,D5],[S3,D9]

CANDIDATE COMBINATION 2 : [S1,D1],[S2,D6],[S3,D9]

CANDIDATE COMBINATION 3 : [S1,D1],[S2,D7],[S3,D9]

⋮

CANDIDATE COMBINATION 64 : [S1,D4],[S2,D8],[S3,D12]

INTERFERENCE ALIGNMENT SCHEME FOR USE IN COMMUNICATION NETWORK

CROSS-REFERENCE TO RELATED APPLICATION(S)

This application claims the benefit under 35 U.S.C. §119(a) of a Korean Patent Application No. 10-2009-0018448, filed on Mar. 4, 2009, in the Korean Intellectual Property Office, the entire disclosure of which is incorporated herein by reference for all purposes.

BACKGROUND

1. Field

The following description relates to a communication network to apply an interference alignment scheme, and more particularly, to a technology that may select transmit-receive pairs.

2. Description of the Related Art

Currently, research regarding a communication network including a plurality of transmit nodes is actively conducted in order to enhance a data transmission rate and a communication reliability. The plurality of transmit nodes may include various types of transmitters, for example, a cellular base station, a femto base station, a fixed base station, a mobile base station, and the like.

Each of the transmit nodes may communicate with at least one corresponding receive node using the same radio resource, for example, a frequency, a time, a code resource, and the like. Here, the transmit node and the at least one corresponding receive node may be referred to as a "transmit-receive pair".

Where the plurality of transmit nodes use the same radio resource, interference may occur in a receive node of a transmit-receive pair due to transmit nodes of other transmit-receive pairs.

An interference control technology, an interference alignment technology, and the like may enhance a usage efficiency of radio resources and may also reduce a decrease in a throughput caused by interference.

SUMMARY

In one general aspect, a communication method for a network using an interference alignment scheme may include calculating information associated with an initial throughput of the network with respect to candidate combinations of transmit-receive pairs between a plurality of transmit nodes and a plurality of receive nodes, calculating information associated with a new throughput of the network with respect to remaining candidate combinations that exclude at least one candidate combination from the candidate combinations, based on the calculated information associated with the initial throughput of the network, and selecting, from the remaining candidate combinations based on the calculated information associated with the new throughput of the network, a target combination to be applied with the interference alignment scheme.

The information associated with the initial throughput of the network may be calculated by calculating information associated with the initial throughput of the network based on precoding matrices that are used by the plurality of transmit nodes and decoding matrices that are used by the plurality of receive nodes in a first time slot. The information associated with the new throughput of the network may be calculated by calculating information associated with the new throughput of the network based on precoding matrices that are used by the plurality of transmit nodes and decoding matrices that are used by the plurality of receive nodes in a second time slot different from the first time slot.

The information associated with the new throughput of the network may be calculated by calculating information associated with the new throughput of the network until the target combination is selected. Also, the information associated with the new throughput of the network may be calculated by calculating information associated with the new throughput of the network with respect to the remaining candidate combinations excluding a predetermined number of candidate combinations from the candidate combinations based on information associated with the initial throughput of the network. Also, the information associated with the new throughput of the network may be calculated by calculating information associated with the new throughput of the network based on precoding matrices that are used by the plurality of transmit nodes and decoding matrices that are used by the plurality of receive nodes. The precoding matrices and the decoding matrices may be continuously updated through an iterative operation.

Information associated with the selected target combination may be provided to at least one of the transmit nodes or the receive nodes. The transmit-receive pairs belonging to the selected target combination may perform communication using the interference alignment scheme.

The candidate combinations may correspond to all possible or probable combinations of the transmit-receive pairs, or may be pre-selected from all the possible or probable combinations.

The plurality of receive nodes may use a zero-forcing decoding scheme or a maximum signal-to-interference plus noise ratio decoding scheme.

In another general aspect, a method of operating a terminal for a network using an interference alignment scheme may include terminating a process of updating a decoding matrix through an iterative operation after a target combination is selected, where the terminal belongs to at least one candidate combination excluded from candidate combinations, and continuing the process of updating the decoding matrix through the iterative operation until the target combination is selected, where the terminal belongs to a target combination. Information associated with an initial throughput of the network is calculated with respect to candidate combinations of transmit-receive pairs between a plurality of transmit nodes and a plurality of receive nodes. Information associated with a new throughput of the network is calculated with respect to remaining candidate combinations excluding at least one candidate combination from the candidate combinations based on the calculated information associated with the initial throughput of the network. A target combination to be applied with the interference alignment scheme is selected from the remaining candidate combinations based on information associated with the new throughput of the network.

A time division duplex scheme may be applied to the network. The terminal may provide to at least one of the transmit terminals at least one of information associated with the updated decoding matrix, information associated with a signal-to-interference plus noise ratio, and information associated with a throughput of a transmit-receive pair to which the terminal belongs.

In still another general aspect, a communication apparatus for a network using an interference alignment scheme may include a calculation unit configured to calculate information associated with an initial throughput of the network with respect to candidate combinations of transmit-receive pairs between a plurality of transmit nodes and a plurality of receive nodes, a combination exclusion unit configured to exclude at least one candidate combination from the candidate combinations based on information associated with the initial throughput of the network, and a combination selection unit configured to select, from the remaining candidate combinations based on information associated with the new throughput of the network, a target combination to be applied with the interference alignment scheme. The calculation unit is configured to calculate information associated with a new throughput of the network with respect to the remaining candidate combinations.

The calculation unit may be configured to calculate information associated with the initial throughput of the network based on precoding matrices that are used by the plurality of transmit nodes and decoding matrices that are used by the plurality of receive nodes in a first time slot. The calculation unit may be configured to calculate information associated with the new throughput of the network based on precoding matrices that are used by the plurality of transmit nodes and decoding matrices that are used by the plurality of receive nodes in a second time slot different from the first time slot.

The may be configured to calculate information associated with the new throughput of the network until the target combination is selected.

Other features and aspects will become apparent from the following detailed description, the drawings, and the claims.

BRIEF DESCRIPTION OF THE DRAWINGS

FIG. 3 is a diagram of exemplary candidate combinations of transmit-receive pairs in the network of FIG. 2.

Figure 1:
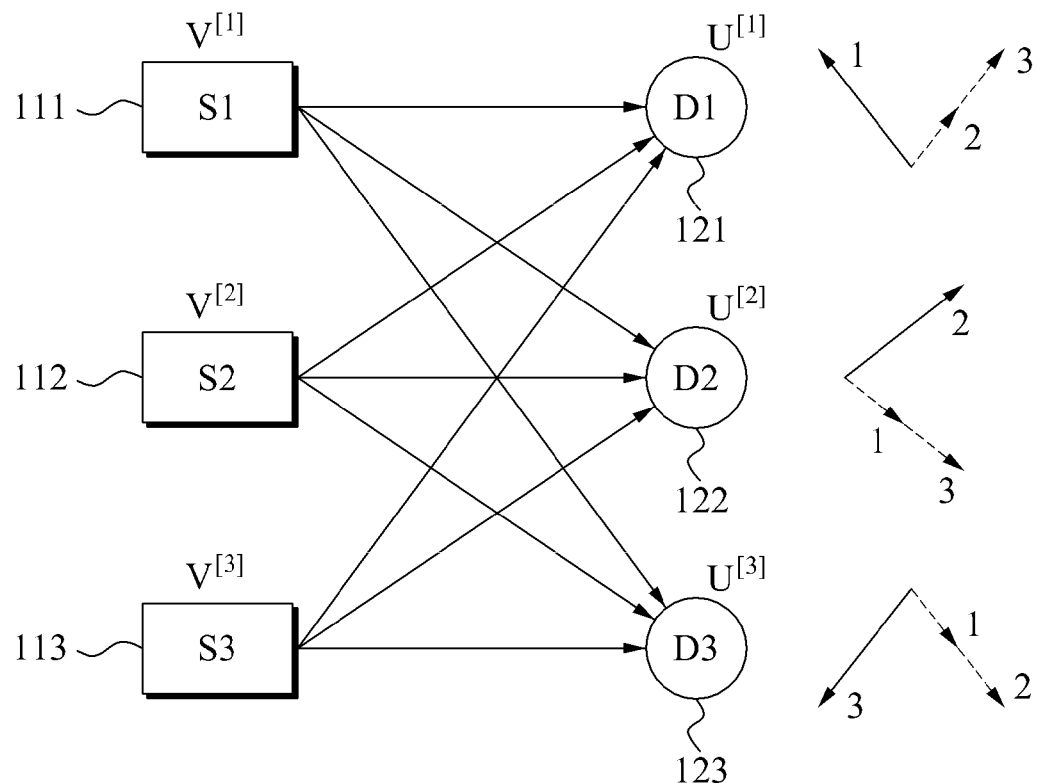
FIG. 1 is a diagram of a network using an exemplary interference alignment scheme.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates a network 100 using an exemplary interference alignment scheme. Referring to FIG. 1, the network 100 using the interference alignment scheme may include a plurality of source nodes S1 111, S2 112, and S3 113 and a plurality of receive nodes D1 121, D2 122, and D3 123. Each of the source nodes S1 111, S2 112, and S3 113 may correspond to each of the receive nodes D1 121, D2 122, and D3 123. Specifically, each of the source nodes S1 111, S2 112, and S3 113 and each of the receive nodes D1 121, D2 122, and D3 123 may constitute a transmit-receive pair.

Each of the source nodes S1 111, S2 112, and S3 113 denotes a data transmission device that includes a fixed base station, a mobile base station, a miniature base station such as a femto base station, a relay station, and the like. Each of the receive nodes D1 121, D2 122, and D3 123 denotes a data reception device that includes a relay station, a fixed terminal, a mobile terminal, and the like.

When each of the source nodes S1 111, S2 112, and S3 113 transmits data using the same radio resource, interference may occur in each of the receive nodes D1 121, D2 122, and D3 123. For example, in the receive node D1 121, a signal of the source node S1 111 corresponds to a desired signal and signals of the source nodes S2 112 and S3 113 correspond to interference. Similarly, interference may occur in the receive nodes D2 122 and D3 123. The interference may decrease a throughput of the network 100. The throughput of a network may be referred to as a "sum rate" that is a sum of throughputs of transmit-receive pairs.

The decrease in the throughput caused by the interference may be prevented or reduced by using an interference alignment scheme. Specifically, the source nodes S1 111, S2 112, and S3 113 may adjust a phase of a transmission signal using precoding matrices $V^{[1]}$, $V^{[2]}$, and $V^{[3]}$, respectively. A transmission signal of each of the source nodes S1 111, S2 112, and S3 113 with the adjusted phase may be transmitted through channels. The receive nodes D1 121, D2 122, and D3 123 may separate a received signal into a desired signal and interference, and cancel the interference in the received signal using reasonably designed decoding matrices $U^{[1]}$, $U^{[2]}$, and $U^{[3]}$, respectively. In particular, each of the receive nodes D1 121, D2 122, and D3 123 may use a zero-forcing decoding scheme or a maximum signal-to-interference plus noise ratio (Max SINR) decoding scheme.

More specifically, it is assumed that arrow indicators (1), (2), and (3) of FIG. 1 denote a desired signal of the receive nodes D1 121, D2 122, and D3 123, respectively. A received signal of the receive node D1 121 may be separated into a desired signal (1) of the receive node D1 121, and an interference (2) and (3). A received signal of the receive node D2 122 may be separated into a desired signal (2) of the receive node D2 122, and an interference (1) and (3). A received signal of the receive node D3 123 may be separated into a desired signal (3) of the receive node D3 123, and an interference (1) and (2).

The receive nodes D1 121, D2 122, and D3 123 may cancel interference in the received signal to extract the desired signal using decoding matrices $U^{[1]}$, $U^{[2]}$, and $U^{[3]}$, respectively. Specifically, the source nodes S1 111, S2 112, and S3 113 may use the precoding matrices $V^{[1]}$, $V^{[2]}$, and $V^{[3]}$, respectively. The receive nodes D1 121, D2 122, and D3 123 may use the decoding matrices $U^{[1]}$, $U^{[2]}$, and $U^{[3]}$, respectively. Through this, it is possible to enhance a usage efficiency of radio resources and to prevent or reduce a decrease in a throughput of the network 100 caused by interference.

Although an expression of the precoding matrices $V^{[1]}$, $V^{[2]}$, and $V^{[3]}$ and the decoding matrices $U^{[1]}$, $U^{[2]}$, and $U^{[3]}$ is used here for ease of description, the precoding matrices $V^{[1]}$, $V^{[2]}$, and $V^{[3]}$ and the decoding matrices $U^{[1]}$, $U^{[2]}$, and $U^{[3]}$ may be in a matrix or vector form. For example, the precoding matrices $V^{[1]}$, $V^{[2]}$, and $V^{[3]}$ and the decoding matrices $U^{[1]}$, $U^{[2]}$, and $U^{[3]}$ may have the matrix or vector form according to a number of data streams of each of the source nodes S1 111, S2 112, and S3 113.

The source nodes S1 111, S2 112, and S3 113, and the receive nodes D1 121, D2 122, and D3 123 may iteratively calculate the precoding matrices $V^{[1]}$, $V^{[2]}$, and $V^{[3]}$ and the decoding matrices $U^{[1]}$, $U^{[2]}$, and $U^{[3]}$ to retrieve optimal or improved precoding matrices and optimal or improved decoding matrices.

Hereinafter, an iterative calculation algorithm to retrieve the optimal or improved precoding matrices and the optimal or improved decoding matrices will be conceptually described. Specifically, the iterative calculation algorithm may define random precoding matrices and retrieve decoding matrices corresponding to the random precoding matrices based on interference occurring in receive nodes. The iterative calculation algorithm may retrieve again new precoding matrices based on the decoding matrices, and retrieve other new precoding matrices based on the new precoding matrices. The iterative calculation algorithm may retrieve optimized or improved precoding matrices and optimized or improved decoding matrices by iteratively performing the above process until the precoding matrices and the decoding matrices are converged.

Where a number of transmit-receive pairs between source nodes and receive nodes is K, for example, K=3 in FIG. 1, and the interference alignment scheme is ideally used, a network applying a time division duplex scheme may achieve a sum rate close to $K/2 \log_2(1+SNR)$ at a high SNR, where SNR is the signal to noise ratio.

Where transmit-receive pairs to be applied with the interference alignment scheme are not determined, the network 100 may need to select the transmit-receive pairs. In particular, where a number of receive nodes is greater than a number of transmit receives, a receive node to constitute a transmit-receive pair together with each of the transmit nodes may need to be selected. While selecting the receive node to constitute the transmit-receive pair, overhead may increase. Accordingly, there is a need for a technology to select optimal or improved transmit-receive pairs with a low amount of calculation resources.

Figure 2:
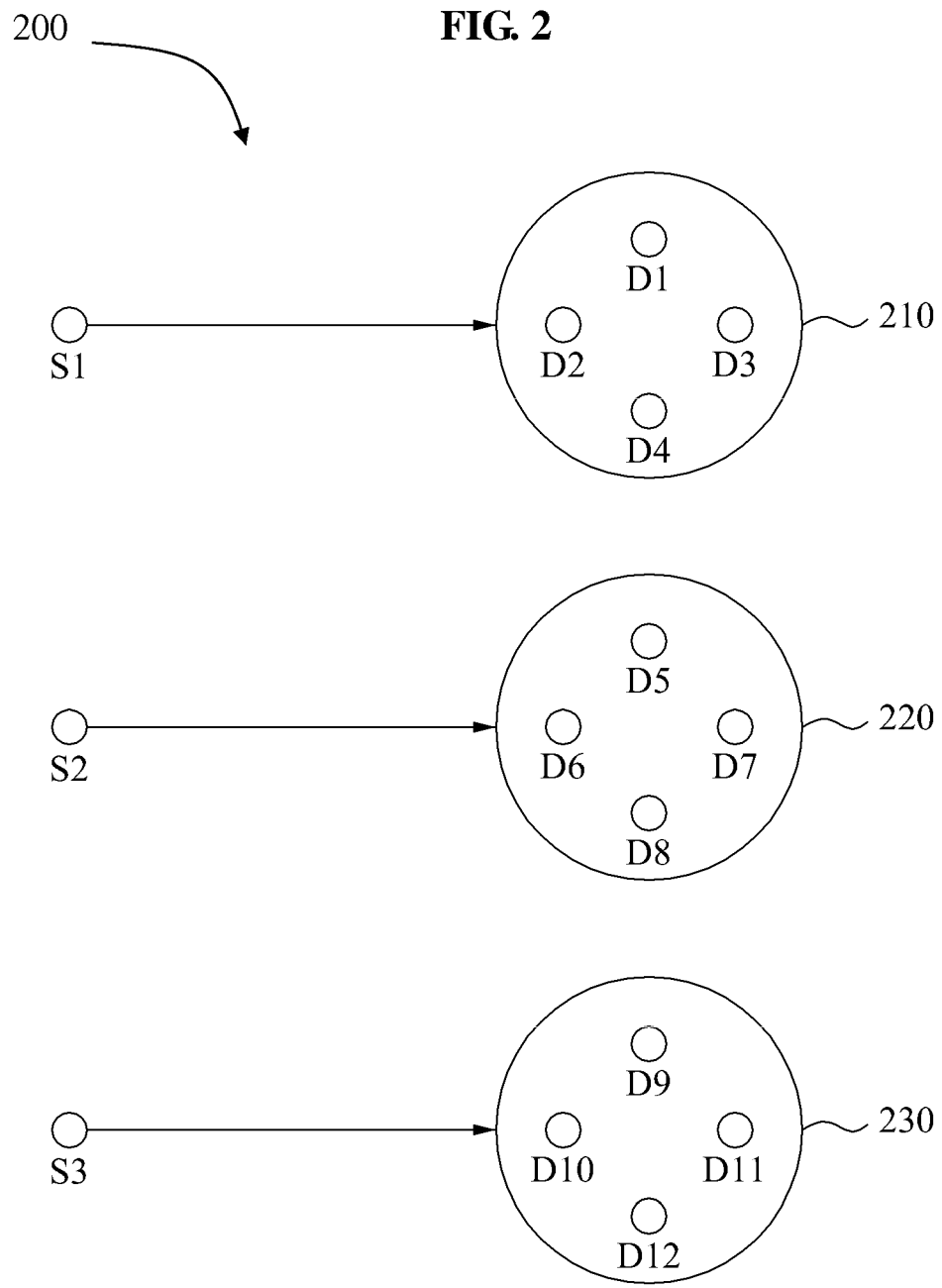
FIG. 2 is a diagram of an exemplary network including a plurality of transmit nodes, a plurality of receive nodes, and a plurality of receive groups.

FIG. 2 illustrates an exemplary network 200 including a plurality of transmit nodes S1, S2, and S3, a plurality of receive nodes D1, D2, D3, D4, D5, D6, D7, D8, D9, D10, D11, and D12, and a plurality of receive groups 210, 220, and 230.

Referring to FIG. 2, twelve (12) receive nodes D1, D2, D3, D4, D5, D6, D7, D8, D9, D10, D11, and D12, and three transmit nodes S1, S2, and S3 may exist. The receive groups 210, 220, and 230 may each include four receive nodes D1, D2, D3, and D4; D5, D6, D7, and D8; and D9, D10, D11, and D12, respectively.

A single transmit node and a single receive node constitute a transmit-receive pair, and each of the transmit nodes S1, S2, and S3 may constitute four transmit-receive pairs. Specifically, the transmit node S1 may constitute transmit-receive pairs with the receive nodes D1, D2, D3, and D4 of the receive group 210. The transmit node S2 may constitute transmit-receive pairs with the receive nodes D5, D6, D7, and D8 of the receive group 220. The transmit node S3 may constitute transmit-receive pairs with the receive nodes D9, D10, D11, and D12 of the receive group 230. Three transmit-receive pairs to be applied with the interference alignment scheme may need to be finally selected.

A combination of the three transmit-receive pairs (hereinafter, a target combination) to be applied with the interference alignment scheme may be any one of 64 candidate combinations. In this case, the target combination may be selected from the 64 candidate combinations based on a throughput of the network 200. Precoding matrices and decoding matrices, used by the transmit nodes and the receive nodes, respectively, may continuously vary through an iterative calculation, as described above, and such variation may affect the throughput of the network 200. Accordingly, in order to select the target combination, the throughput of the network 200 may also need to be recalculated as the precoding matrices and the decoding matrices vary. Where the throughput of the network 200 is recalculated with respect to all of the 64 candidate combinations, large calculation resources may be required and thus there is a need for a technology to decrease the need for large calculation resources.

FIG. 3 illustrates an example of candidate combinations of transmit-receive pairs in the network 200 of FIG. 2. Referring to FIG. 3, 64 candidate combinations of transmit-receive pairs may exist in the network 200 of FIG. 2. Specifically, a candidate combination 1 may include transmit-receive pairs [S1,D1], [S2,D5], and [S3,D9]. A candidate combination 2 may include transmit-receive pairs [S1,D1], [S2,D6], and [S3,D9]. A candidate combination 3 may include transmit-receive pairs [S1,D1], [S2,D7], and [S3,D9]. Similarly, a candidate combination 64 may include transmit-receive pairs [S1,D4], [S2,D8], and [S3,D12].

Figure 4:
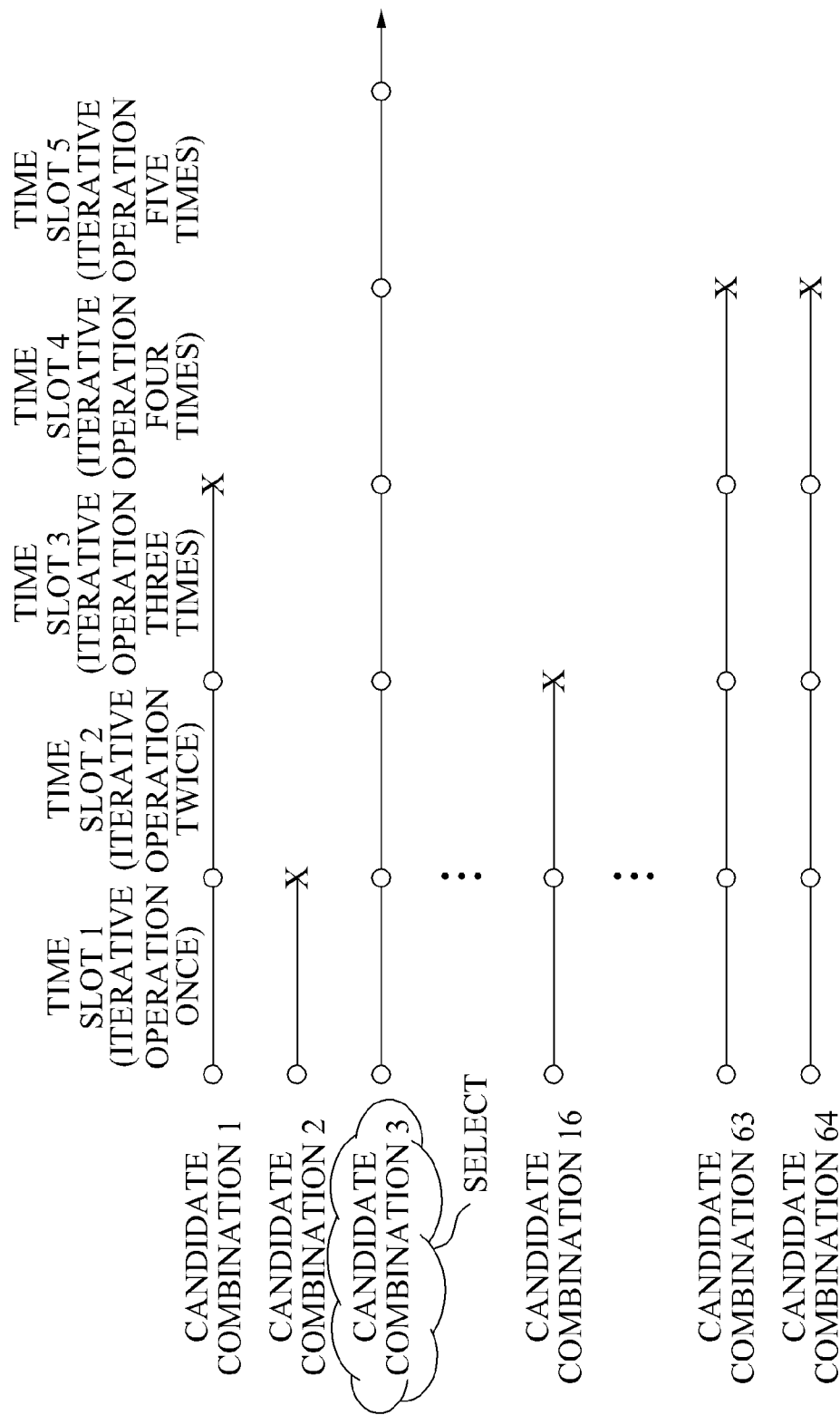
FIG. 4 is a diagram of an exemplary process of selecting, as a target combination, a candidate combination from a plurality of candidate combinations.

FIG. 4 illustrates an exemplary process of selecting, as a target combination, a candidate combination 3 from a plurality of candidate combinations.

Referring to FIG. 4, a communication apparatus may calculate a throughput of a network with respect to all the candidate combinations based on precoding matrices and decoding matrices that are used in a time slot 1. The precoding matrices and the decoding matrices used in the time slot 1 may be calculated by performing an iterative operation once. The communication apparatus may exclude at least one candidate combination from 64 candidate combinations based on the initially calculated throughput of the network. For example, when the throughput of the network for a candidate combination 2 is lowest, the communication apparatus may exclude the candidate combination 2 from 64 candidate combinations.

After the candidate combination 2 is excluded, the communication apparatus may then recalculate the throughput of the network with respect to the remaining 63 candidate combinations based on precoding matrices and decoding matrices that are used in a time slot 2. The precoding matrices and the decoding matrices used in the time slot 2 may be calculated by performing the iterative operation another time, a total of twice. When the throughput of the network for a candidate combination 16 is lowest, the communication apparatus may exclude the candidate combination 16 from the remaining 63 candidate combinations.

After the candidate combination 2 and the candidate combination 16 are excluded, the communication apparatus may recalculate the throughput of the network with respect to the remaining 62 candidate combinations based on precoding matrices and decoding matrices that are used in a time slot 3. The precoding matrices and the decoding matrices used in the time slot 3 may be calculated by performing the iterative operation a total of three times.

The communication apparatus may select, as the target combination, a candidate combination 3 that is finally left by iteratively performing the above operation. A number of candidate combinations used to calculate the throughput of the network may decrease as a number of iterative operations increases. Accordingly, the communication apparatus may select the target combination with a lower amount of calculation resources.

In some exemplary implementations, the communication apparatus may exclude at least two candidate combinations in a single time slot. For example, the communication apparatus may exclude two or three candidate combinations corresponding to a low throughput of the network in the single time slot.

Figure 5:
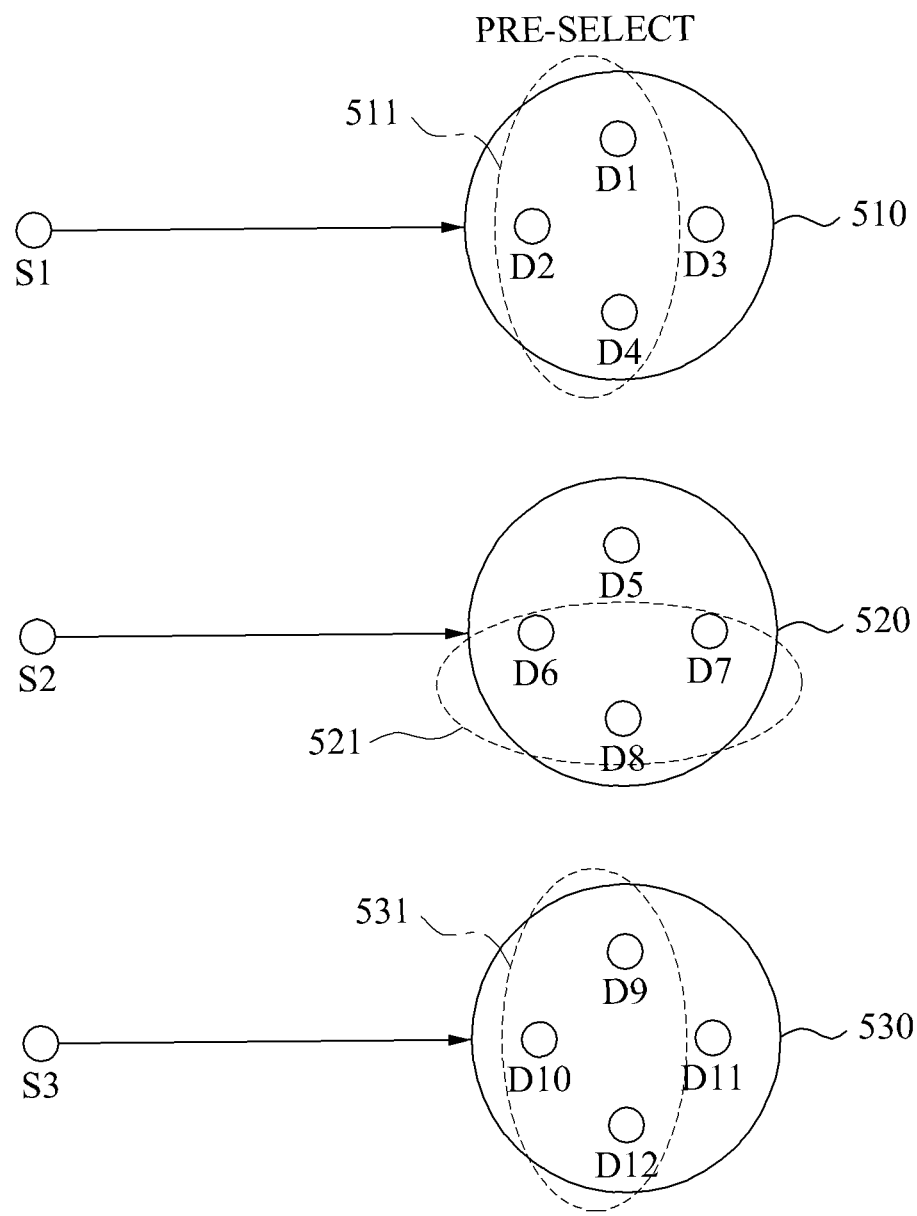
FIG. 5 is a diagram of an exemplary selection of a predetermined number of receive nodes from each of receive groups in order to decrease a complexity or a calculation amount.

FIG. 5 illustrates an example of selecting a predetermined number of receive nodes from each of receive groups 510, 520, and 530 in order to decrease a complexity or a calculation amount. Referring to FIG. 5, in order to decrease the calculation amount, a communication apparatus may pre-select receive nodes to be included in each of the receive groups 510, 520, and 530. Specifically, as a number of receive nodes to be included in each of the receive groups 510, 520, and 530 increases, a number of candidate combinations may increase whereby calculation resources required to select a target combination may increase. The communication apparatus may constitute the candidate combinations by considering only transmit-receive pairs including the pre-selected receive nodes, and may select the target combination from the candidate combinations.

For example, when only receive nodes D1, D2, and D4 indicated by a dotted line 511 are pre-selected from the receive group 510, a number of probable transmit-receive pairs between a source node S1 and the receive group 510 may decrease from four to three. Similarly, the number of candidate combinations may decrease in a manner that receive nodes D6, D7, and D8 indicated by a dotted line 521 are pre-selected from the receive group 520, and receive nodes D9, D10, and D12 indicated by a dotted line 531 are pre-selected from the receive group 530.

Figure 6A:
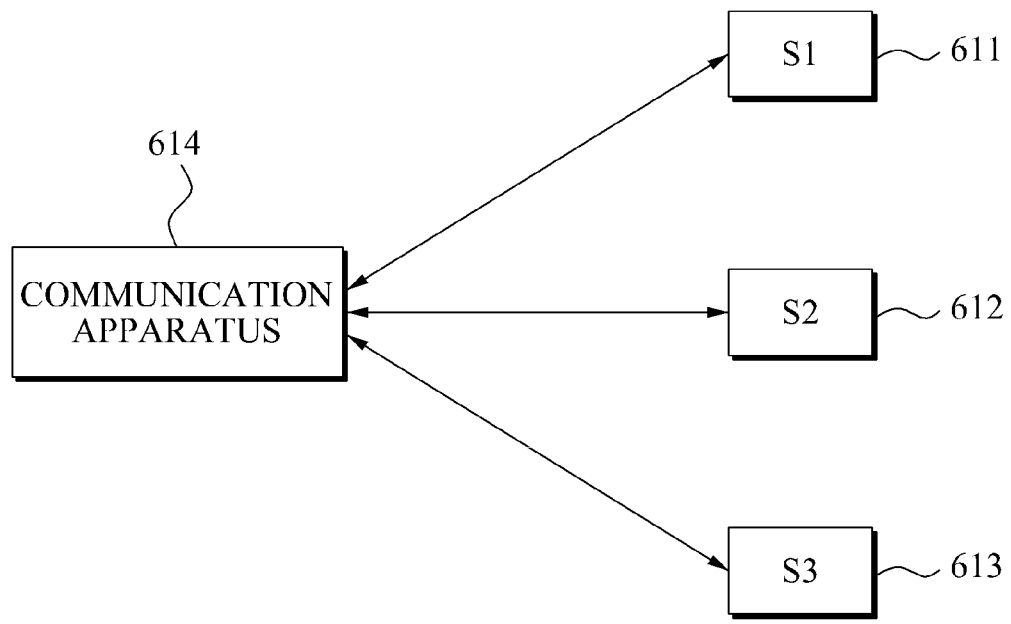
FIGS. 6A and 6B are block diagrams of exemplary circumstances of installing a communication apparatus.
Figure 6B:
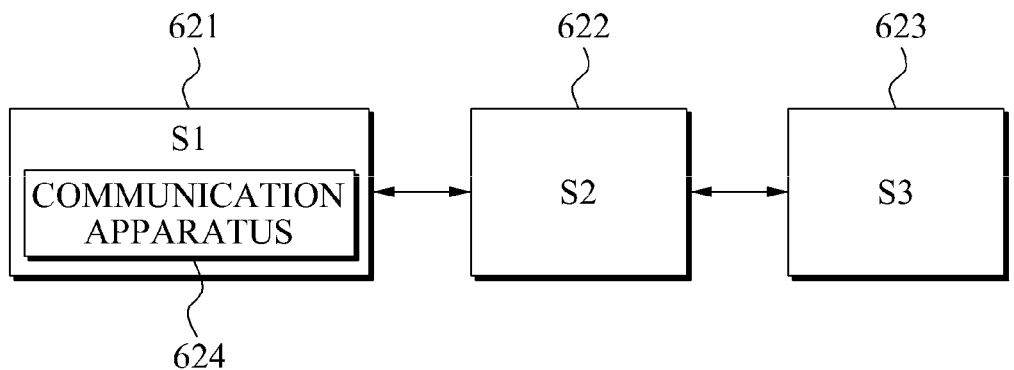

FIGS. 6A and 6B illustrate various exemplary circumstances of installing a communication apparatus. Referring to FIG. 6A, an exemplary communication apparatus 614 may exist in an upper node of transmit nodes S1 611, S2 612, and S3 613. For example, the communication apparatus 614 may be a radio network controller to control all the transmit nodes S1 611, S2 612, and S3 613. In this case, the communication apparatus 614 may be provided in a location separate from the transmit nodes S1 611, S2 612, and S3 613.

Referring to FIG. 6B, another exemplary communication apparatus 624 may be provided together with a transmit node S1 621 that is one of transmit nodes S1 621, S2 622, and S3 623. In this case, the communication apparatus 624 may receive various types of information from the other transmit nodes S2 622 and S3 623, and select a target combination based on the received information. In addition to a function of selecting the target combination, the communication apparatus 624 may perform other various types of functions.

Figure 7:
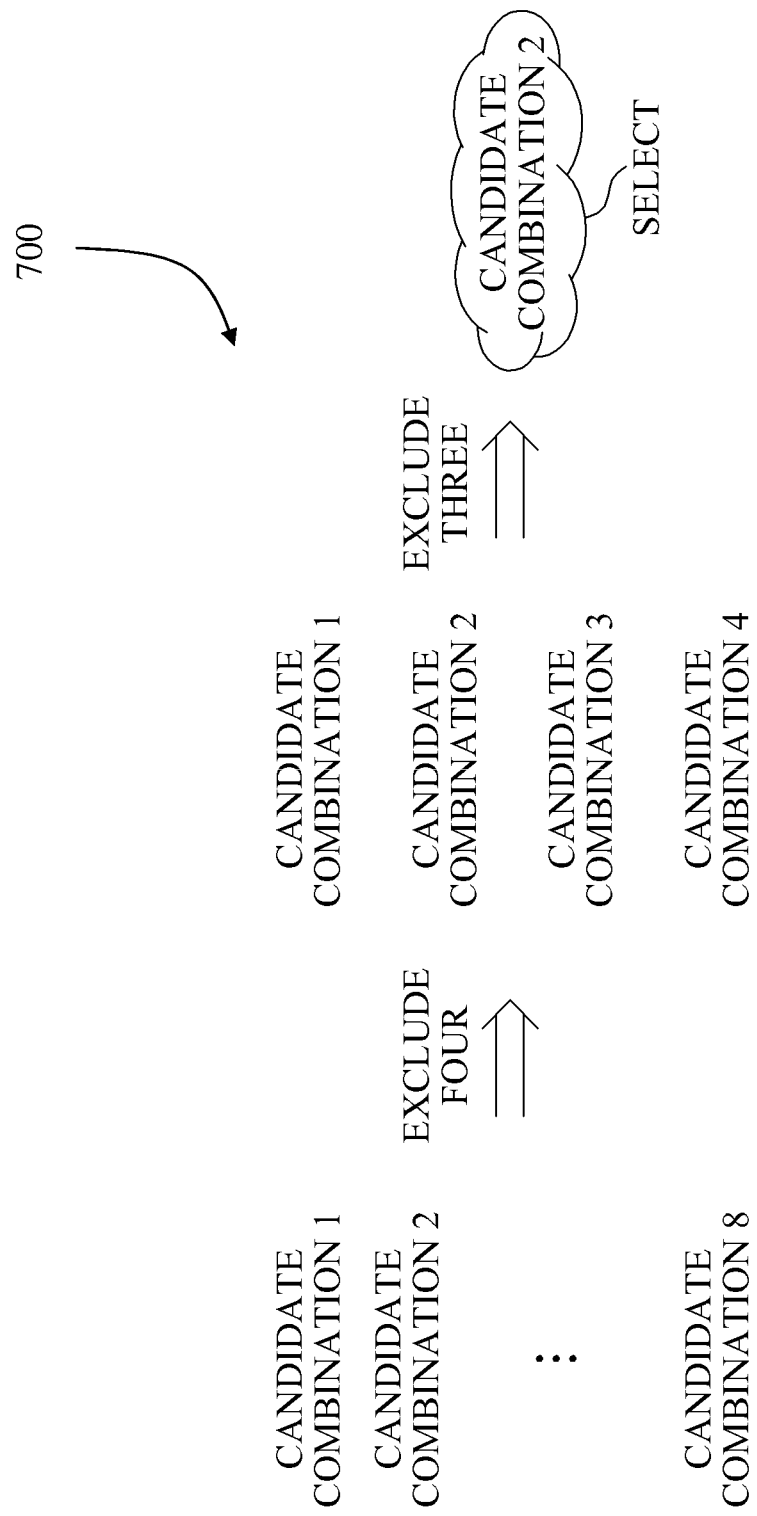
FIG. 7 is a diagram of an exemplary procedure for excluding at least two candidate combinations from a plurality of candidate combinations at a one time.

FIG. 7 illustrates an exemplary process 700 of excluding at least two candidate combinations from a plurality of candidate combinations at any one time. Referring to FIG. 7, for example, where eight candidate combinations exist, a communication apparatus may calculate a throughput of a network with respect to all the eight candidate combinations, and exclude four candidate combinations from the eight candidate combinations, based on the throughput of the network. For example, four candidate combinations with a low throughput of the network may be excluded.

The communication apparatus may recalculate the throughput of the network with respect to the remaining four candidate combinations, and exclude three candidate combinations from the remaining four candidate combinations. Where a candidate combination 2 is finally left through the above iterative operation, the candidate combination 2 may be selected as the target combination.

A number of candidate combinations to be excluded at any one time may be predetermined, and may also be adjusted depending on circumstances.

Figure 8:
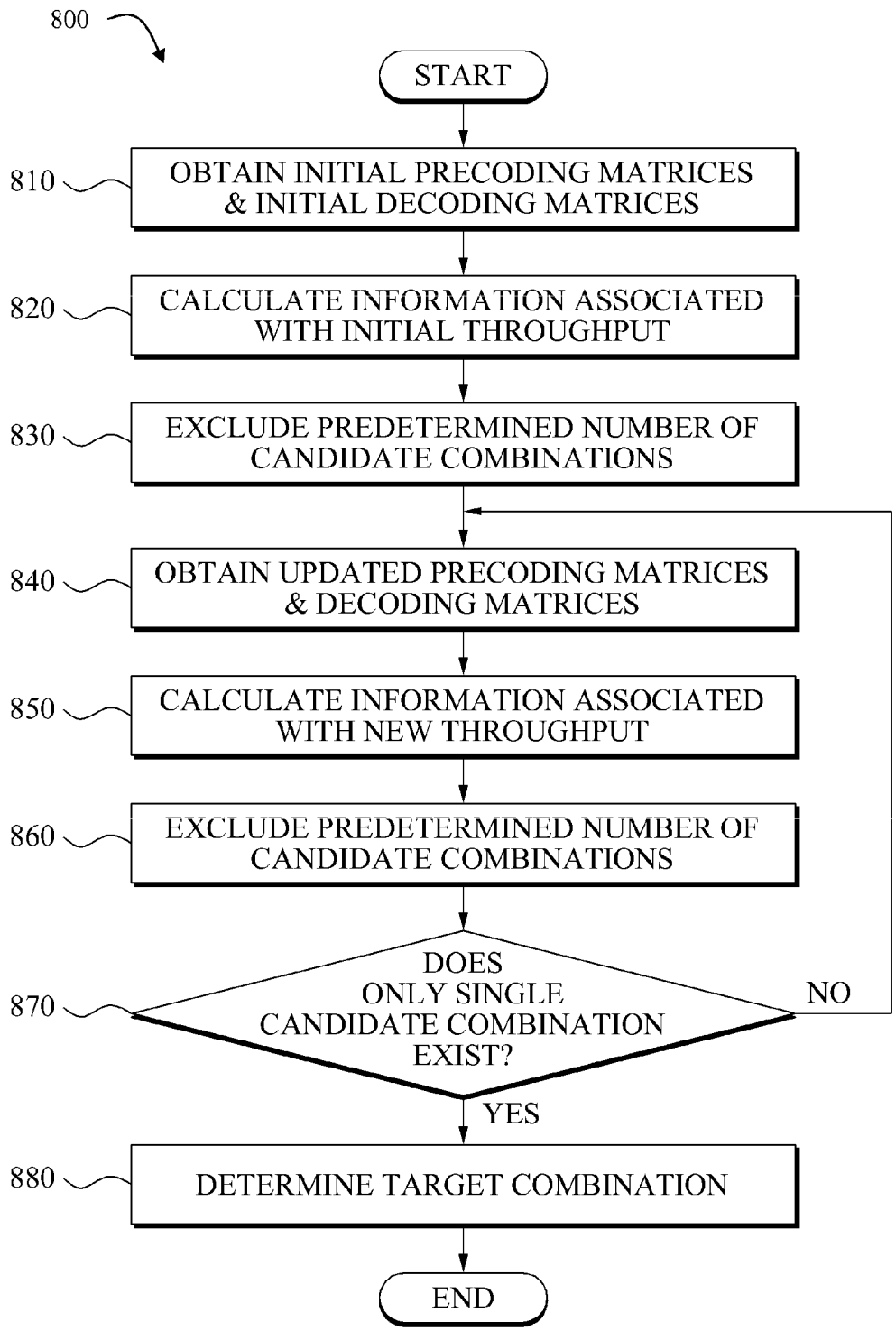
FIG. 8 is a flowchart of an exemplary communication procedure for a network using an interference alignment scheme.

FIG. 8 is a flowchart of an exemplary communication procedure 800 for a network using an interference alignment scheme. Referring to FIG. 8, in operation 810, a communication apparatus for the network using the interference alignment scheme may obtain initial precoding matrices and initial decoding matrices that are used by transmit-receive pairs between a plurality of transmit nodes and a plurality of receive nodes.

In operation 820, the communication apparatus may calculate information associated with an initial throughput of the network with respect to all the currently existing candidate combinations based on the initial precoding matrices and the initial decoding matrices. Information associated with the throughput of the network may include information associated with a sum rate, and information that is required to calculate the sum rate, for example, information regarding a throughput of each of the transmit-receive pairs, a signal-to-interference plus noise ratio (SINR), and the like. In particular, the communication apparatus may not need to calculate the sum rate, and therefore such information may be provided from the transmit nodes or the receive nodes.

In operation 830, the communication apparatus may exclude a predetermined number of candidate combinations from the currently existing candidate combinations based on information associated with the initial throughput of the network.

When the predetermined number of candidate combinations is excluded, the excluded candidate combinations may not become the target combination and thus the communication apparatus may suspend an iterative calculation or updating of precoding matrices and decoding matrices. Also, the communication apparatus may update the precoding matrices and the decoding matrices by further performing an iterative operation with respect to the remaining candidate combinations.

In operation 840, the communication apparatus may obtain the updated precoding matrices and decoding matrices.

In operation 850, the communication apparatus may calculate information associated with a new throughput of the network based on the updated precoding matrices and decoding matrices.

In operation 860, the communication apparatus may exclude a predetermined number of candidate combinations from the currently remaining candidate combinations based on information associated with the new throughput of the network.

In operation 870, the communication apparatus may determine whether only a single candidate combination currently exists. Where at least two candidate combinations exist, the remaining at least two candidate combinations may update again the precoding matrices and the decoding matrices and the communication apparatus may perform again operations 840, 850, and 860.

Conversely, when only the single candidate combination remains, the communication apparatus may select the candidate combination as the target combination in operation 880. The communication apparatus may inform transmit-receive pairs belonging to the candidate combination that the candidate combination is selected as the target combination. The transmit-receive pairs belonging to the target combination may perform communication with a known interference alignment scheme.

The methods described above including the communication procedure for a network using an interference alignment scheme may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The storage media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

Figure 9:
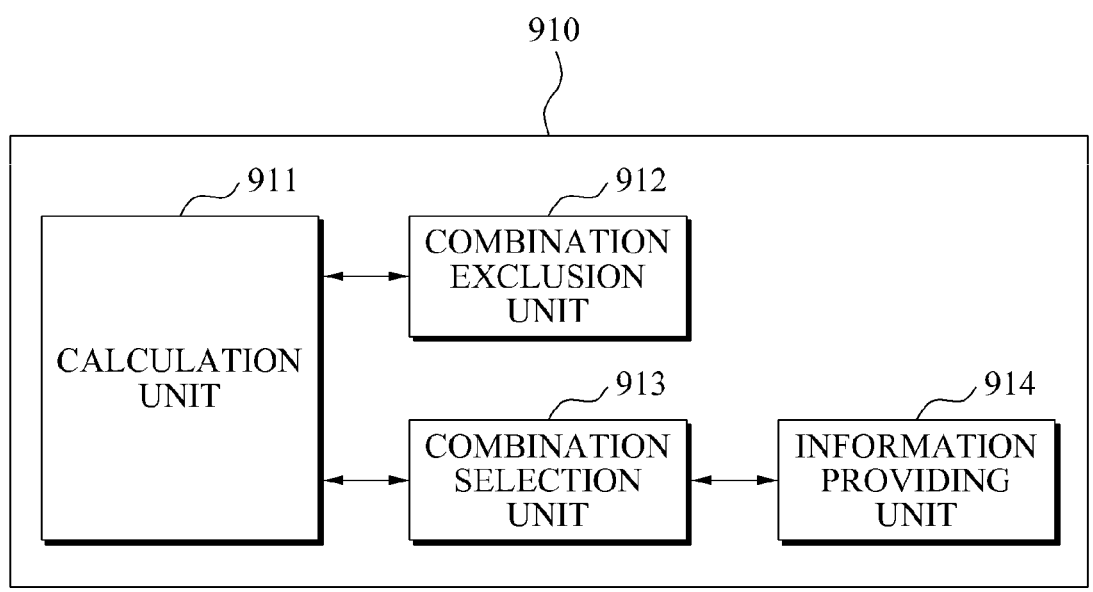
FIG. 9 is a block diagram of an exemplary communication apparatus for a network using an interference alignment scheme.

FIG. 9 illustrates an exemplary communication apparatus 910 for a network using an interference alignment scheme. Referring to FIG. 9, the communication apparatus 910 may include a calculation unit 911, a combination exclusion unit 912, a combination selection unit 913, and an information providing unit 914.

The calculation unit 911 may calculate information associated with an initial throughput of the network with respect to candidate combinations of transmit-receive pairs between a plurality of transmit nodes and a plurality of receive nodes.

The combination exclusion unit 912 may exclude at least one candidate combination from the candidate combinations based on information associated with the initial throughput of the network. The plurality of transmit nodes and the plurality of receive nodes may perform an iterative operation until a target combination is selected. Accordingly, when the target combination is not selected, transmit nodes and receive nodes belonging to the remaining candidate combinations may update precoding matrices and decoding matrices.

The calculation unit 911 may calculate information associated with a new throughput of the network with respect to the remaining candidate combinations.

The combination selection unit 913 may select, from the remaining candidate combinations based on information associated with the new throughput of the network, a target combination to be applied with the interference alignment scheme.

The information providing unit 914 may provide information associated with the selected target combination to at least one of the transmit nodes or the receive nodes.

Descriptions made above with reference to FIGS. 1 through 8 may be applicable to the communication apparatus 910 of FIG. 9 and thus further detailed descriptions will be omitted here.

The network may sequentially decrease a number of candidate combinations during a process to select a target combination, and may select a combination of transmit-receive pairs with a low complexity or low calculation resources.

Also, the network may select a combination of transmit-receive pairs to enhance a throughput of the network even with a low complexity or low calculation resources.

Also, the network may decrease calculation resources by applying a target combination selection algorithm with respect to candidate combinations that are pre-selected from all the candidate combinations.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A communication method for a network using an interference alignment scheme, the method comprising:
 calculating an initial throughput of the network with respect to each of candidate combinations of transmit-receive pairs between a plurality of transmit nodes and a plurality of receive nodes;
 calculating a new throughput of the network with respect to remaining candidate combinations that exclude at least one candidate combination from the candidate combinations, based on the calculated initial throughput of the network;
 selecting, from the remaining candidate combinations based on the calculated new throughput of the network, a target combination to be applied with the interference alignment scheme; and
 performing communication between a transmit node and a receive node belonging to the target combination.

2. The method of claim 1, wherein:
 The calculating of the initial throughput of the network comprises calculating the initial throughput of the network based on precoding matrices that are used by the plurality of transmit nodes and decoding matrices that are used by the plurality of receive nodes in a first time slot; and
 the calculating of the new throughput of the network comprises calculating the new throughput of the network based on precoding matrices that are used by the plurality of transmit nodes and decoding matrices that are used by the plurality of receive nodes in a second time slot different from the first time slot.

3. The method of claim 2, wherein the precoding matrices that are used by the plurality of transmit nodes and the decoding matrices that are used by the plurality of receive nodes are continuously updated through an iterative operation.

4. The method of claim 1, wherein the calculating of the new throughput of the network comprises calculating the new throughput of the network until the target combination is selected.

5. The method of claim 1, wherein the calculating of the new throughput of the network comprises calculating the new throughput of the network with respect to the remaining candidate combinations excluding a predetermined number of candidate combinations from the candidate combinations based on the calculated initial throughput of the network.

6. The method of claim 1, wherein:
the calculating of the new throughput of the network comprises calculating the new throughput of the network based on precoding matrices that are used by the plurality of transmit nodes and decoding matrices that are used by the plurality of receive nodes; and
the precoding matrices and the decoding matrices are continuously updated through an iterative operation.

7. The method of claim 1, further comprising providing information associated with the selected target combination to at least one of the transmit nodes or the receive nodes.

8. The method of claim 1, wherein transmit-receive pairs belonging to the selected target combination perform communication using the interference alignment scheme.

9. The method of claim 1, wherein the candidate combinations correspond to all of possible combinations of the transmit-receive pairs, or are pre-selected from all of the possible combinations.

10. The method of claim 1, wherein the plurality of receive nodes use a zero-forcing decoding scheme or a maximum signal-to-interference plus noise ratio (Max SINR) decoding scheme.

11. A non-transitory computer-readable storage medium storing a program to implement the method of claim 1.

12. A computer program embodied on a non-transitory computer readable medium, the computer program being configured to control a processor to perform the method of claim 1.

13. A method of operating a terminal for a network using an interference alignment scheme, the method comprising:
calculating an initial throughput of the network with respect to each of candidate combinations of transmit-receive pairs between a plurality of transmit nodes and a plurality of receive nodes;
calculating a new throughput of the network with respect to remaining candidate combinations excluding at least one candidate combination from the candidate combinations based on the calculated initial throughput of the network;
selecting a target combination to be applied with the interference alignment scheme from the remaining candidate combinations based on the new throughput of the network;
terminating a process of updating a decoding matrix through an iterative operation after the target combination is selected, where the terminal belongs to the at least one candidate combination excluded from the candidate combinations;
continuing the process of updating the decoding matrix through the iterative operation until the target combination is selected, where the terminal belongs to the target combination; and
performing communication between a transmit node and a receive node belonging to the target combination.

14. The method of claim 13, further comprising applying a time division duplex scheme to the network.

15. The method of claim 14, wherein the terminal provides, to at least one of transmit terminals, at least one of the updated decoding matrix, an SINR, and a throughput of a transmit-receive pair to which the terminal belongs.

16. The method of claim 13, further comprising:
using a zero-forcing decoding scheme or a maximum signal-to-interference plus noise ratio (Max SINR) decoding scheme at the plurality of receive nodes.

17. A communication apparatus for a network using an interference alignment scheme, the apparatus comprising:
a calculation unit configured to calculate an initial throughput of the network with respect to each of candidate combinations of transmit-receive pairs between a plurality of transmit nodes and a plurality of receive nodes;
a combination exclusion unit configured to exclude at least one candidate combination from the candidate combinations based on the initial throughput of the network; and
a combination selection unit configured to select, from remaining candidate combinations based on a calculated new throughput of the network, a target combination to be applied with the interference alignment scheme,
wherein the calculation unit is configured to calculate the new throughput of the network with respect to the remaining candidate combinations: and
wherein a transmit node and a receive node of the target combination perform communication.

18. The communication apparatus of claim 17, wherein:
the calculation unit is configured to calculate the initial throughput of the network based on precoding matrices that are used by the plurality of transmit nodes and decoding matrices that are used by the plurality of receive nodes in a first time slot, and
the calculation unit is configured to calculate the new throughput of the network based on precoding matrices that are used by the plurality of transmit nodes and decoding matrices that are used by the plurality of receive nodes in a second time slot different from the first time slot.

19. The communication apparatus of claim 17, wherein the calculation unit is configured to calculate the new throughput of the network until the target combination is selected.

20. The communication apparatus of claim 17, wherein the plurality of receive nodes use a zero-forcing decoding scheme or a maximum signal-to-interference plus noise ratio (Max SINR) decoding scheme.

* * * * *